(12) United States Patent
Baumeister

(10) Patent No.: US 8,375,813 B2
(45) Date of Patent: Feb. 19, 2013

(54) ROTARY DRIVE

(76) Inventor: Karlheinz Baumeister, Balingen-Ostdorf (DE)

( * ) Notice: Subject to any disclaimer, the term of this patent is extended or adjusted under 35 U.S.C. 154(b) by 179 days.

(21) Appl. No.: 12/689,060

(22) Filed: Jan. 18, 2010

(65) Prior Publication Data

US 2010/0218625 A1 Sep. 2, 2010

(51) Int. Cl.
*F16H 3/06* (2006.01)
*F16H 27/02* (2006.01)
*F16H 29/02* (2006.01)
*F16H 29/20* (2006.01)

(52) U.S. Cl. ..................... 74/89.35; 74/89.23

(58) Field of Classification Search ........... 74/89, 89.23, 74/89.34, 89.35, 89.37, 63; 5/81.1 R, 83.1, 5/610, 616
See application file for complete search history.

(56) References Cited

U.S. PATENT DOCUMENTS

| 3,391,722 | A | * | 7/1968 | Ligh | 160/188 |
| 3,731,546 | A | * | 5/1973 | MacDonald | 74/63 |
| 4,613,353 | A | * | 9/1986 | Voisine | 65/163 |
| 6,253,632 | B1 | | 7/2001 | Poulek | |

FOREIGN PATENT DOCUMENTS

| DE | 103 21 807 | 12/2004 |
| DE | 20 2007 015 811 | 4/2009 |
| EP | 1 477 086 | 11/2004 |
| EP | 2 080 452 A1 | 3/2008 |
| EP | 2 147 615 A1 | 7/2008 |
| FR | 1328909 | 7/1960 |
| FR | 2 161 491 | 7/1973 |

OTHER PUBLICATIONS

Translation of EP1477086.*
European Patent Application Serial No. EP 2 147 615 Search Report dated Dec. 3, 2008, 3 pages.
Search Report for EPC Appln. Serial No. EP 10 00 0438 dated May 3, 2010 (German 4 pages); and Translation of same in English (4 pages).

* cited by examiner

*Primary Examiner* — Justin Krause
(74) *Attorney, Agent, or Firm* — Andrew F. Young, Esq.; Lackenbach Siegel, LLP

(57) ABSTRACT

A rotary drive, with a drive element, with an outer tube, with an end piece mounted and able to rotate in relation to the outer tube and unable to shift axially, with a helical slider arranged able to move axially in the outer tube but not rotate, with a helical shaft arranged axially parallel in the outer tube, which interacts by a steep thread with a thread profile of the helical slider, wherein the relative axial movement of helical slider and helical shaft brought about by the drive element is transformed into a relative rotation of outer tube and end piece, wherein the drive element is arranged coaxially inside the outer tube, the helical shaft and the thread profile of the helical slider are arranged coaxially in the outer tube, and the end piece is mounted coaxially in at least one end of the outer tube.

14 Claims, 14 Drawing Sheets

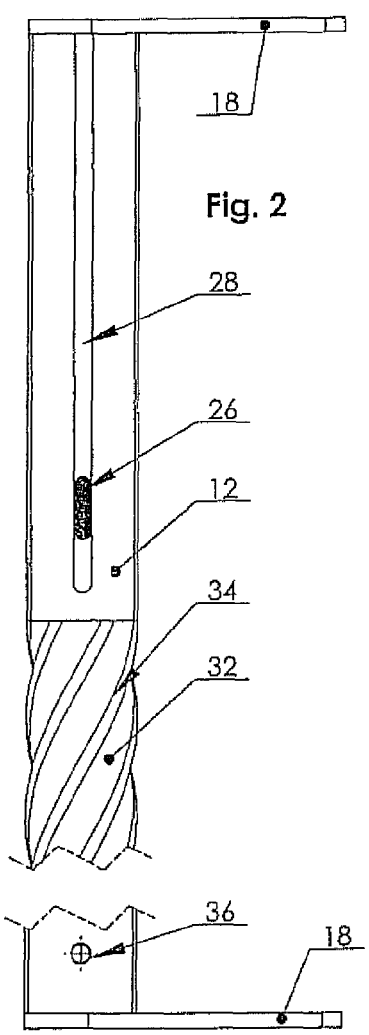
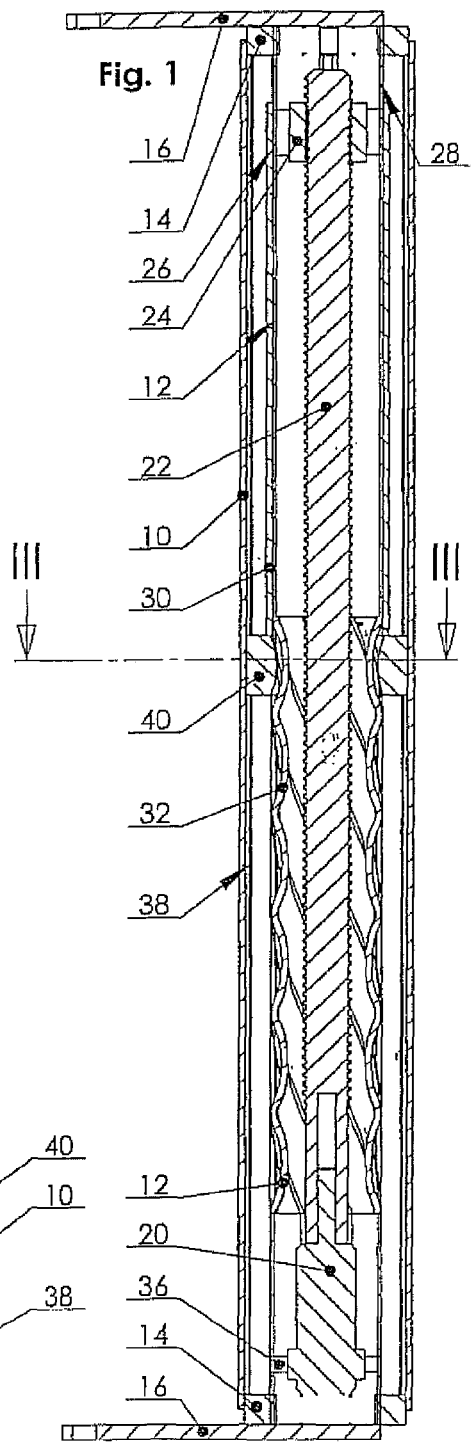
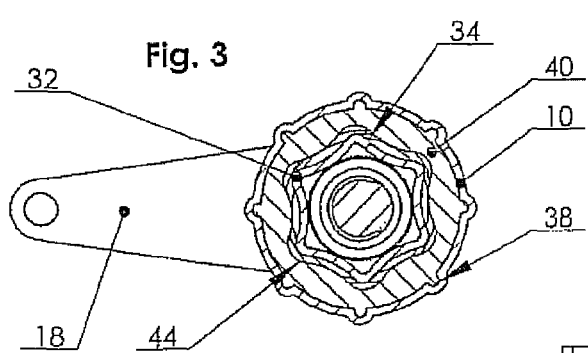

SECTION VI-VI

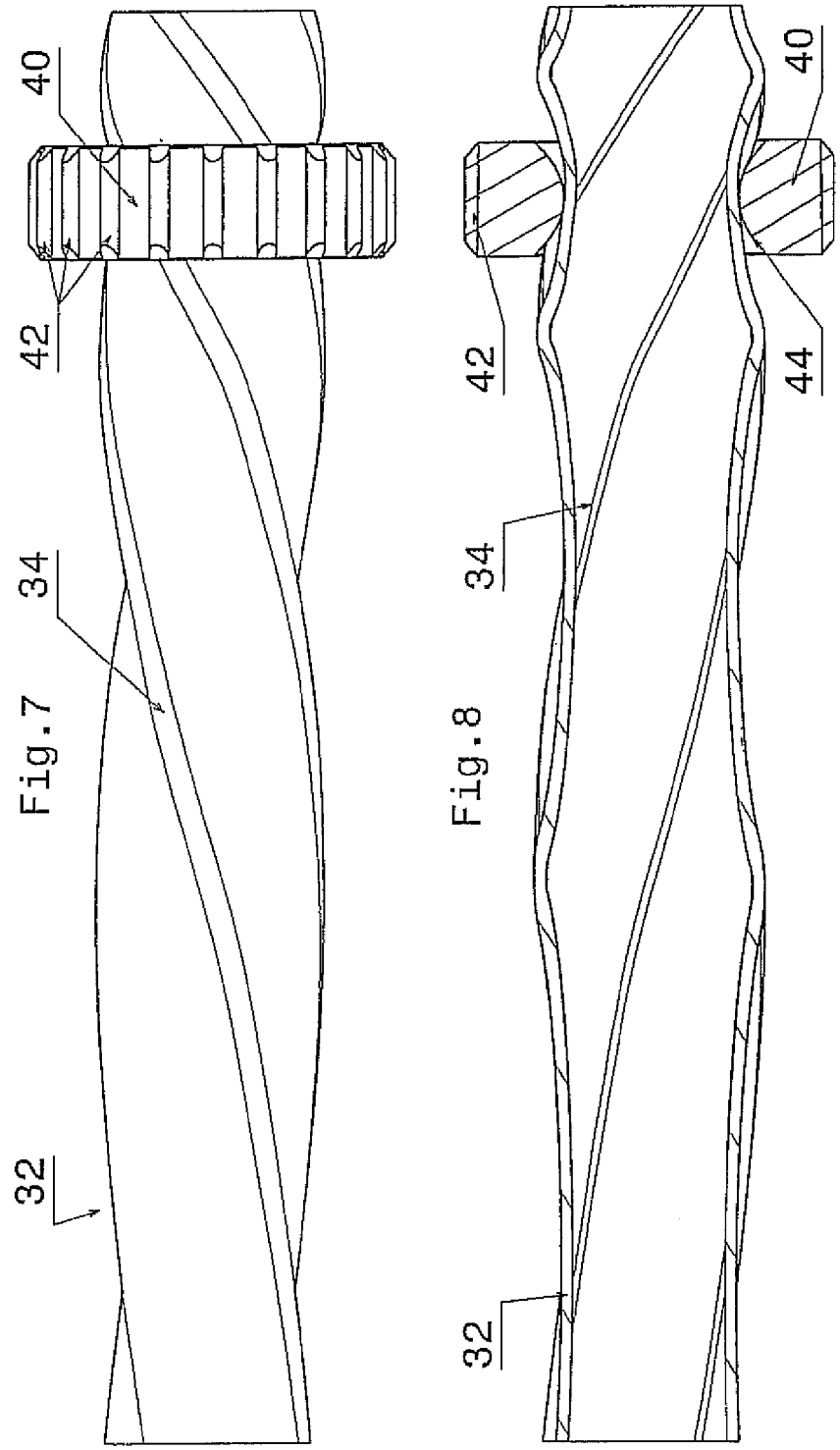

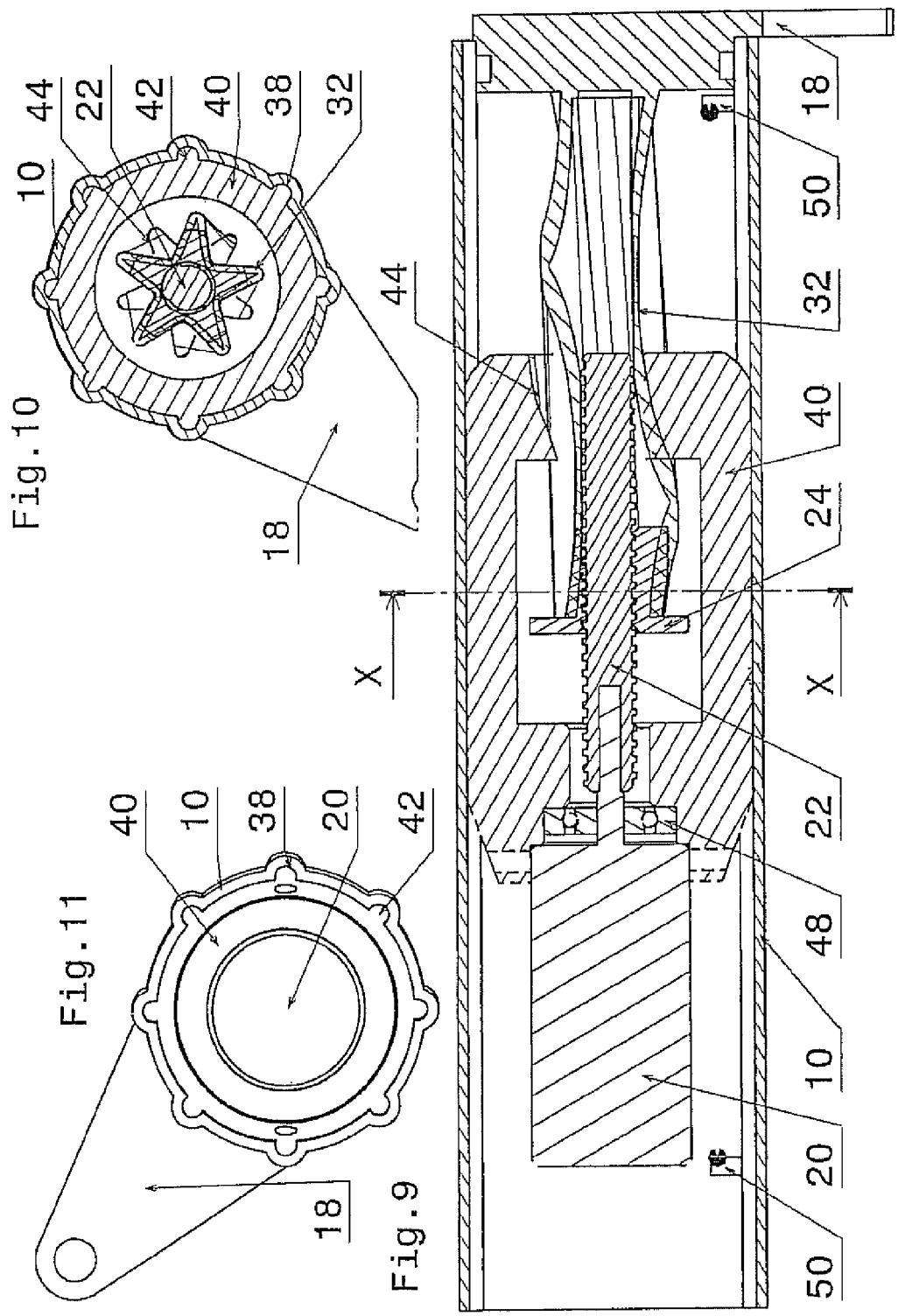

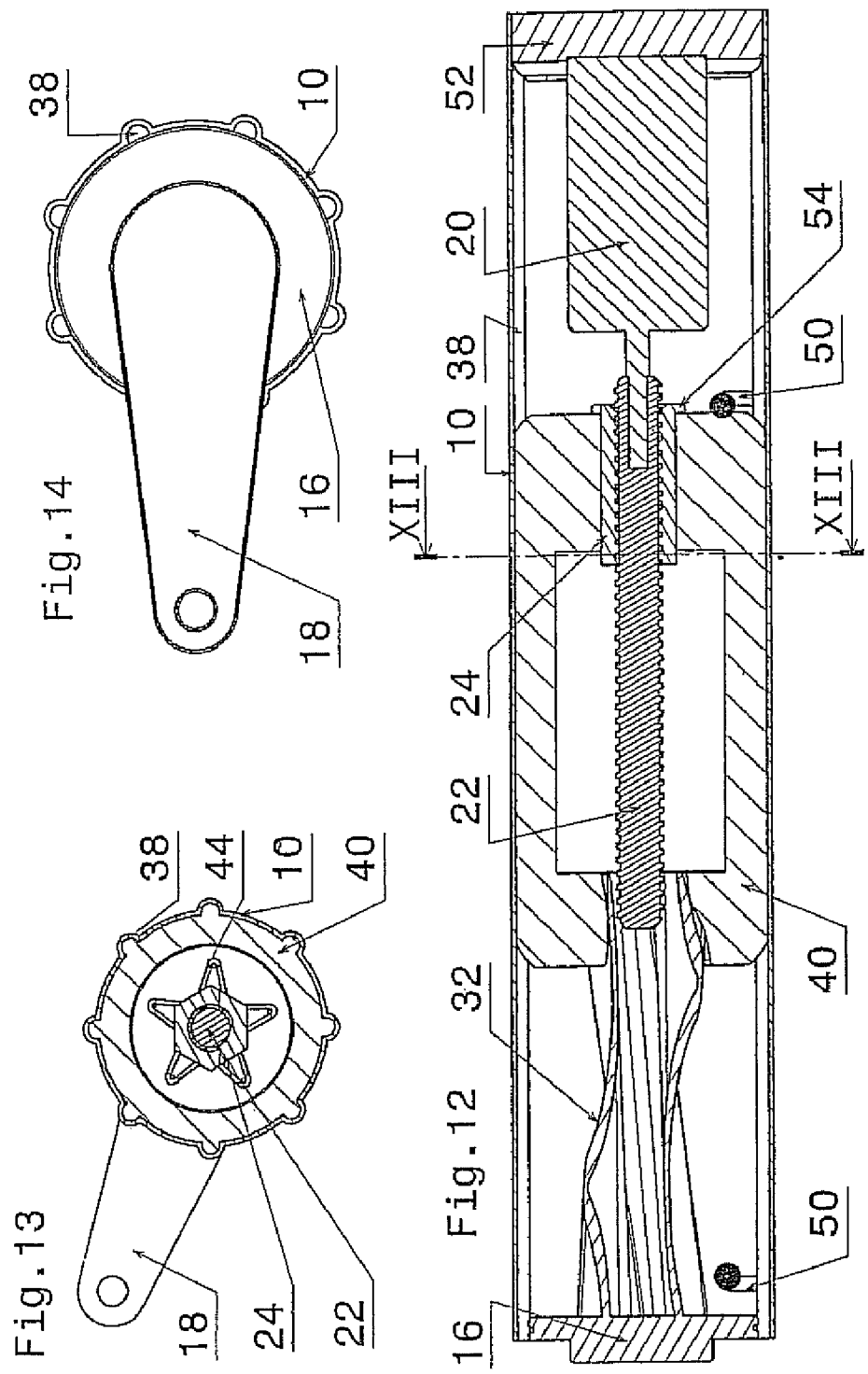

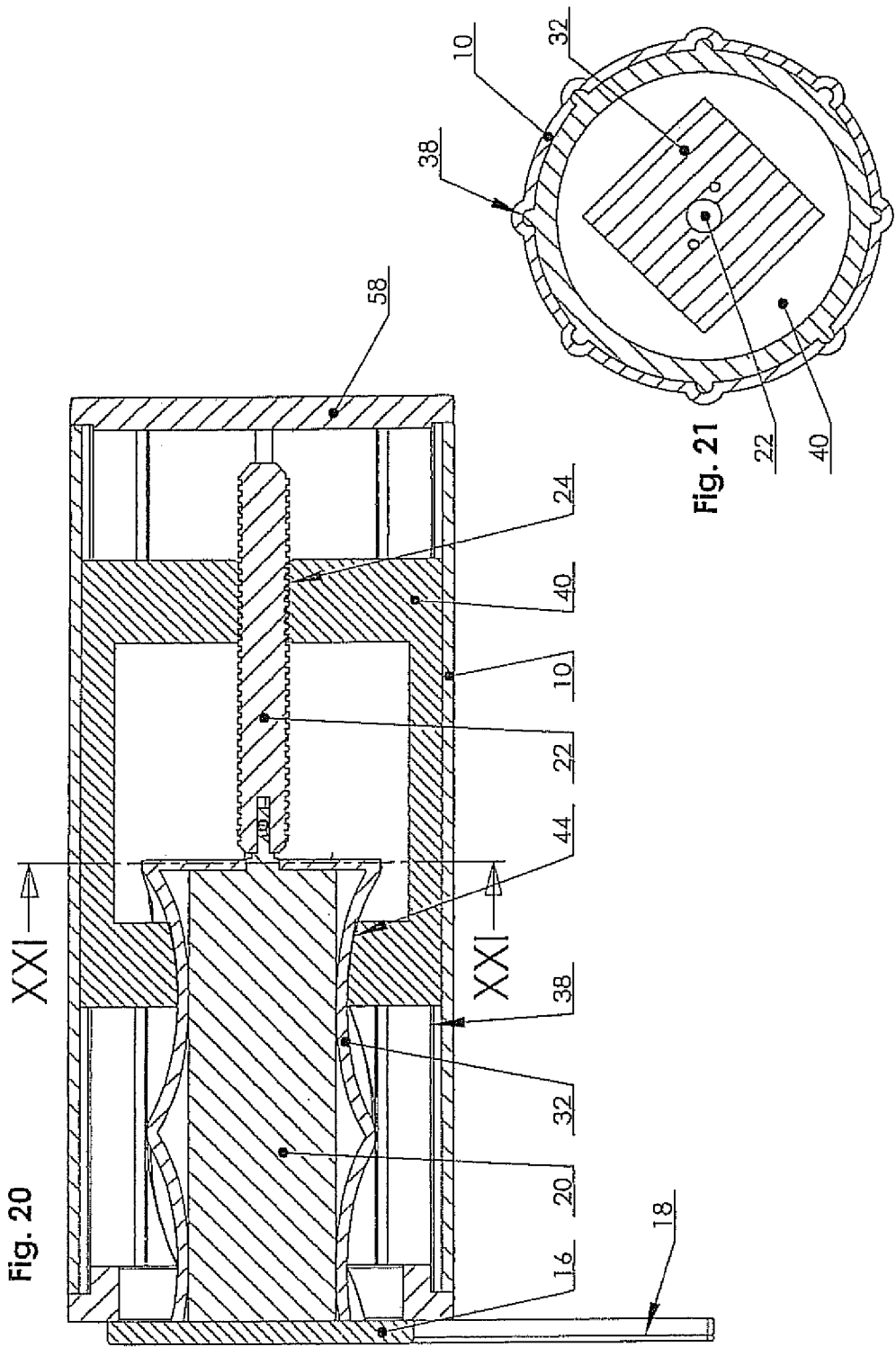

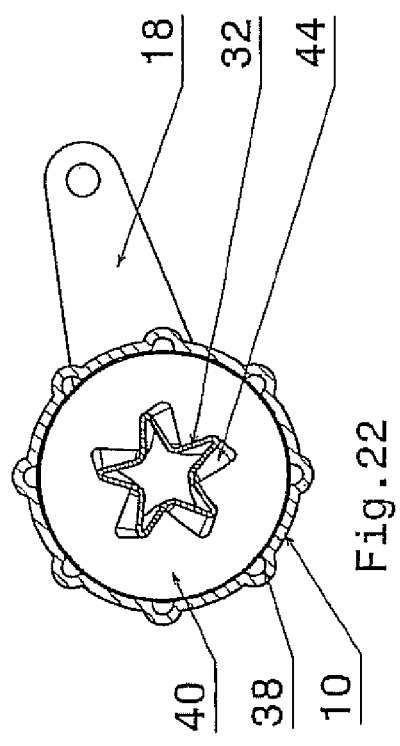
Fig.23 SECTION XXIII-XXIII
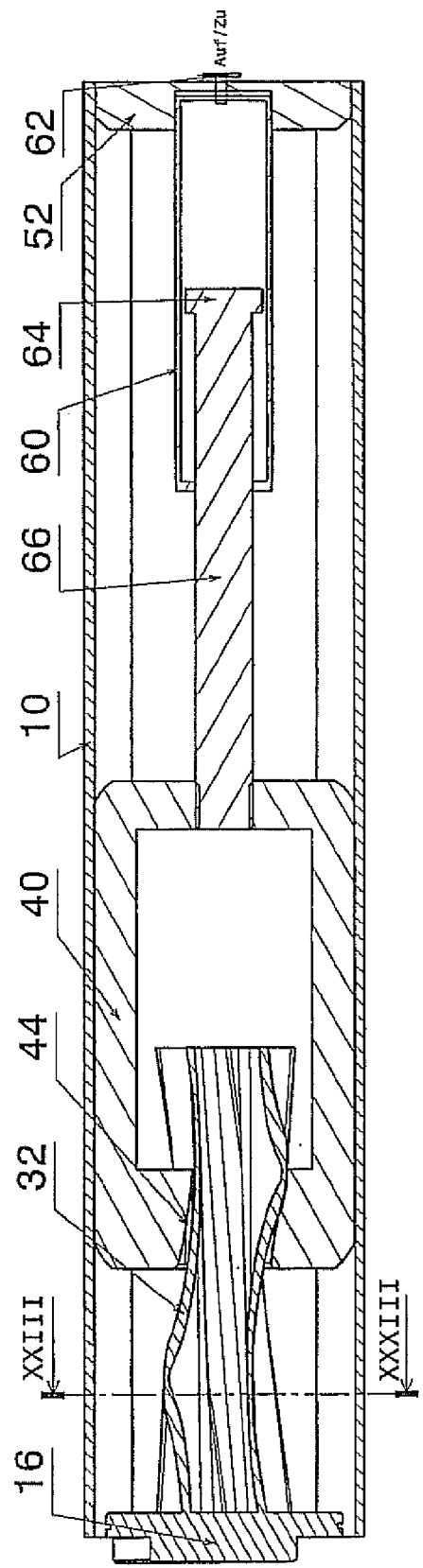
Fig.22

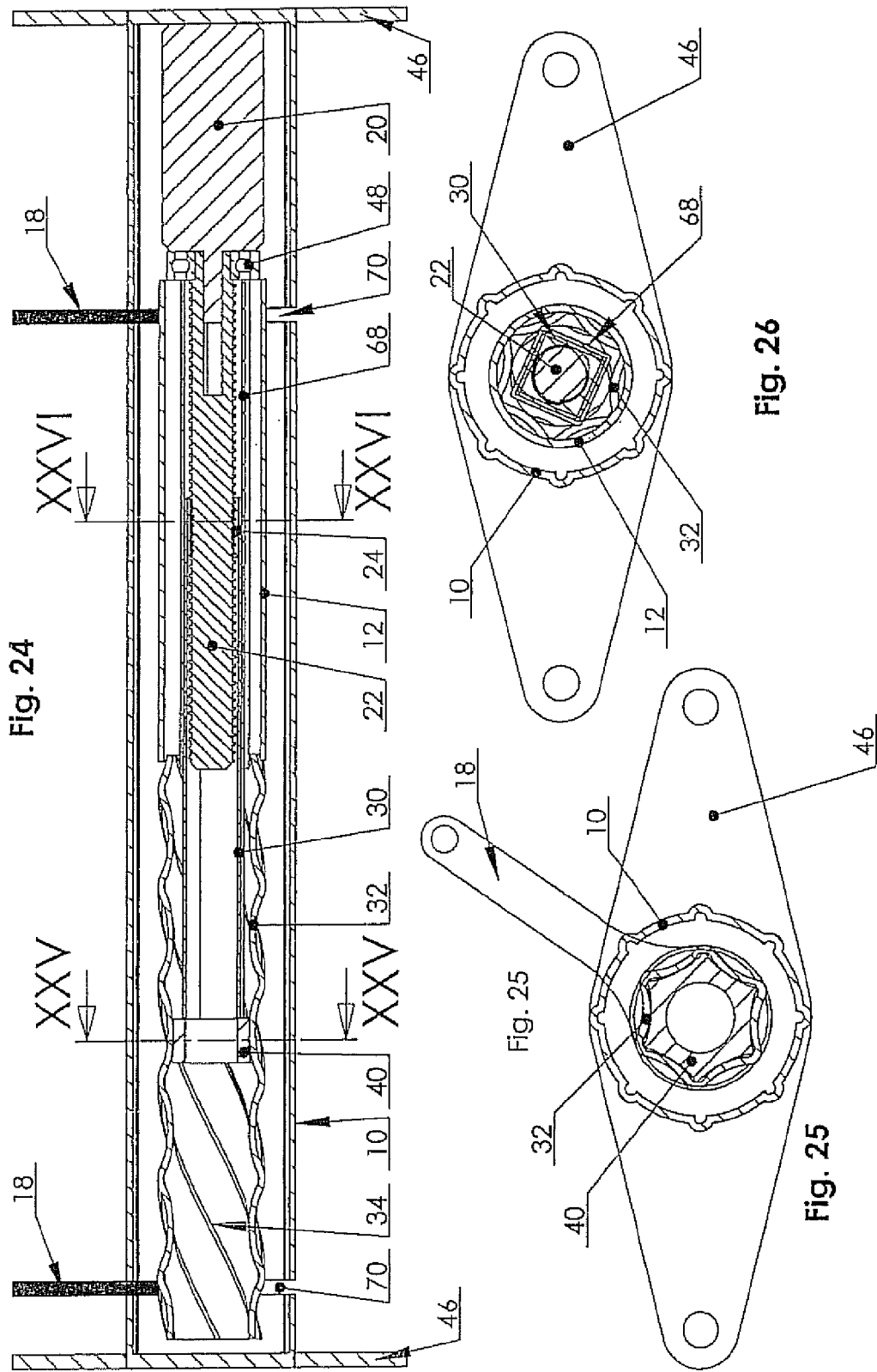

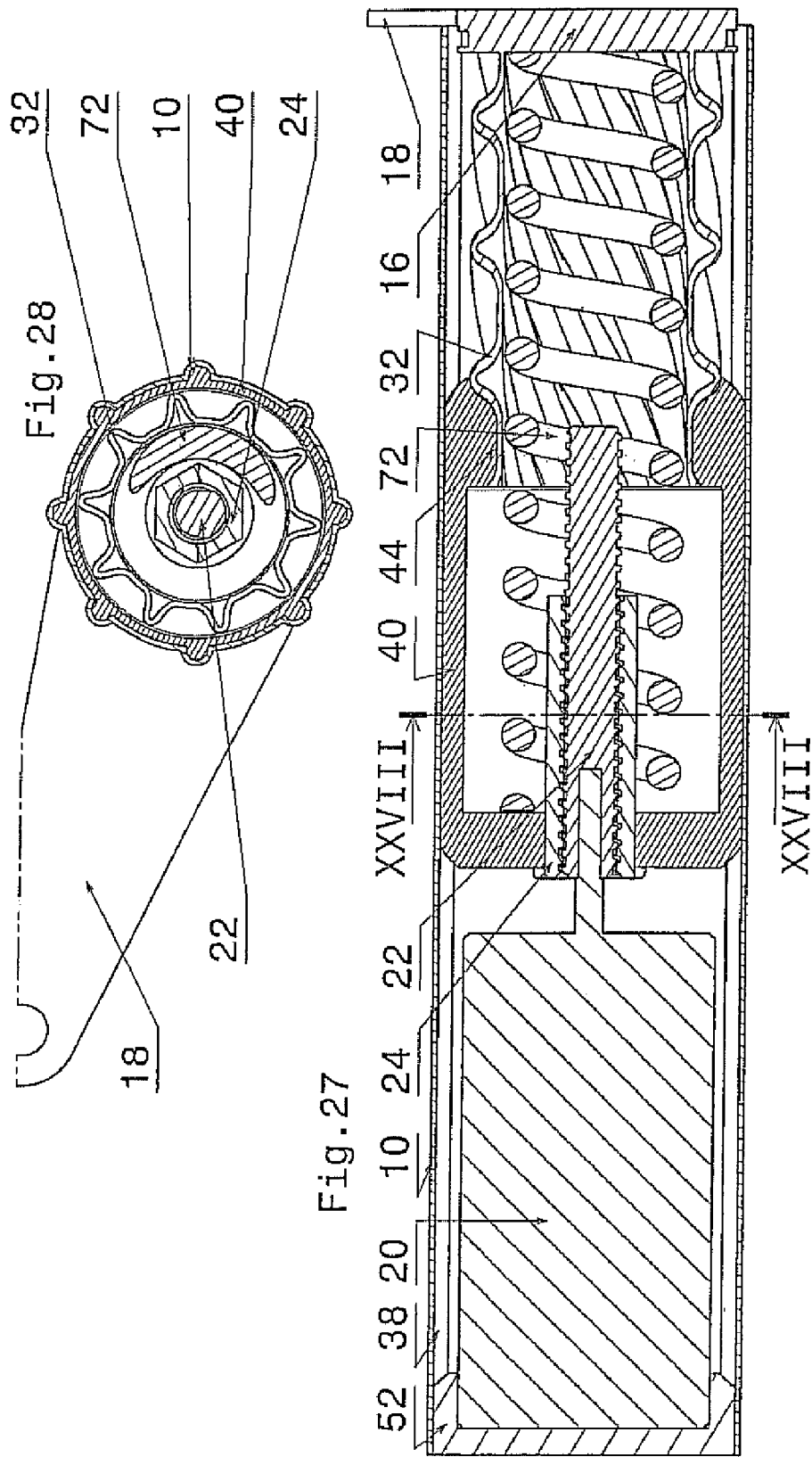

ROTARY DRIVE

CROSS REFERENCE TO RELATED APPLICATIONS

This application is related to European Patent Application Serial No. 08 013 128.7, filed Jul. 22, 2008, the entire contents of which is herein incorporated fully by reference.

FIGURE FOR PUBLICATION

FIG. 1.

BACKGROUND OF THE INVENTION

1. Field of the Invention

The present invention relates to a rotary drive which serves to turn or swivel two structural parts relative to each other. More specifically, the present invention relates to a rotary drive with a drive element, which serves to turn or swivel two structural parts relative to each other. The drive has an outer tube and at least one end piece that is able to rotate in relation to the outer tube without shifting axially.

2. Description of the Related Art

The related art involves rotary drives which serve to turn or swivel two structural parts relative to each other. Such structural parts can be doors, covers or the like of furniture or vehicles. Likewise, such rotary drives can be used to swivel furniture parts relative to each other, e.g., head or foot parts of bedsteads relative to the bed frame.

In DE 103 21 807 A1, FIGS. 1 and 2, a rotary drive of this kind is shown. In an outer tube is arranged a helical slider, able to move axially but not able to rotate, being moved in the outer tube from an electric motor by means of a threaded spindle. Arranged axially parallel to the threaded spindle is a helical shaft with a steep thread, which meshes with a thread profile of the helical slider. The helical shaft is led out axially from the outer tube at both ends. If the helical slider is shoved axially in the outer tube, the helical shaft will turn, as is known, e.g., for screw drills. The helical shaft led out from the outer tube at both ends is thus rotated relative to the outer tube. The pitch of the nonbraking steep thread of the helical shaft is a multiple of the pitch of the threaded spindle, so that a strong speed reduction or torque transmission results between the drive motor and the rotary drive. The drawback here is that the drive motor is arranged outside the outer tube and makes a bend relative to this. Furthermore, the axially parallel arrangement of the threaded spindle and the helical shaft results in a relatively large overall diameter of the rotary drive.

Moreover, in DE 103 21 807 A1, FIGS. 6 and 7, a rotary drive is shown wherein the threaded spindle, driven by the outer drive motor arranged at a bend, is coaxially arranged in the outer tube. A helical slider runs on the threaded spindle, being led without rotation by additional linear guides, which are arranged axially parallel to the threaded spindle in the outer tube. The outer tube sits on the helical slider with a steep threading, so that the axial displacement of the helical slider leads to a rotation of the outer tube. Besides the drive motor once again being arranged at a bend outside the outer tube, one drawback of this configuration is that the outer tube has helical grooves, so that the outer tube cannot be manufactured in simple fashion in an extrusion or drawing process. The linear guides arranged axially parallel in the outer tube moreover enlarge the diameter of the rotary drive.

What is not appreciated by the prior art is that an axially parallel arrangement of the threaded spindle and the helical shaft in rotary drives results in a relatively large overall diameter of the rotary drive. Additionally, in those configurations utilizing helical grooves, the outer tube cannot be manufactured in a simple fashion by an extrusion or drawing process. The linear guides arranged axially parallel in the outer tube moreover enlarge the diameter of the rotary drive.

Accordingly, there is a need for an improved rotary drive so that more compact outer dimensions can be realized and the manufacturing of the rotary drive can be simplified.

ASPECTS AND SUMMARY OF THE INVENTION

An aspect of the present invention is to provide a rotary drive which serves to turn or swivel two structural parts relative to each other and has more compact outer dimensions wherein the manufacturing of the rotary drive can be simplified.

In the rotary drive of the present invention, all mechanical components are arranged coaxially inside the outer tube. In particular, the drive element, such as an electric motor, a pneumatic spring, or some other fluid-operated drive unit is also accommodated coaxially in the outer tube. The completely coaxial design of the entire rotary drive affords a compact dimensioning. In particular, a rotary drive can also be realized for strong turning and swiveling movements with relatively small diameter. Since all components are arranged inside the outer tube, the entire rotary drive can be designed fully encapsulated. At the periphery, the outer tube encloses the entire mechanical construction. At the axial ends, the outer tube is closed off either by an end piece which can rotate relative to the outer tube or by a closure cap firmly inserted into the outer tube. This total encapsulation makes the rotary drive not susceptible to faults and for the most part maintenance-free. Especially when used for furniture, such as beds in hospital facilities or similar applications, the complete encapsulation of the rotary drive is advantageous for hygienic reasons.

The guide grooves fashioned in the outer tube of the rotary drive are axially parallel, so that the outer tube can be manufactured in simple manner in the extrusion or drawing process and it has good stiffness and stability.

The rotary drive can be configured such that an end piece able to rotate relative to the outer tube is mounted only at one end of the outer tube, or corresponding rotatable end pieces are arranged at both ends of the outer tube. This affords great variability in the use of the rotary drive, since it can be mounted by only one end on one structural part and by the outer tube on the other structural part, or by both ends on the one structural part and by the outer tube on the other structural part. In one special embodiment, the rotary drive can also be configured with two helical shafts, each one being connected by an end piece at one of the two ends. In this way, different rotary movements can be produced between the outer tube and each of the two end pieces.

In one preferred embodiment, the drive element is a motor, which drives the rotation of a threaded spindle mounted coaxially in the outer tube. A spindle nut running on the threaded spindle translates the rotation into an axial movement, which in turn brings about the relative axial movement between the helical shaft and the helical slider. The ratio of pitches of the non-self-braking steep thread of the helical shaft and the threaded spindle determines the speed stepdown or torque transmission between the motor and the rotary drive. Thus, very large speed reductions and strong torque transmissions can be realized in a simple design. One special advantage results in that the pitch of the steep thread of the helical shaft can also be varied along its axial length, i.e., over the axial displacement path of the helical slider. If the helical shaft is configured with constant pitch of the steep thread over the entire path of the helical slider, the angular velocity and the torque is constant over the entire swivel angle of the rotary drive. If the pitch of the partial thread of the helical shaft increases progressively or decreases degressively, the speed of rotation will increase or decrease depending on the angle of rotation or the torque will decrease or increase. Thanks to this variation in the pitch of the steep thread, the rotary drive can thus be adapted optimally to the particular application. For example, at the beginning and at the end of a swivel movement the angular velocity can be decreased and in the middle of the swivel path it can be increased.

For many applications, due to safety factors, a so-called "free-wheeling" of the rotary drive is needed. By such a free-wheeling is meant a provision by which the rotary drive is only active in one direction of turning, but in the opposite direction of turning the drive moment of the rotary drive is inactive. For example, a cover or the headpiece of a bed frame can be slid up by the active torque of the rotary drive, while when closing the cover or sliding down the headpiece the rotary drive is not active. The cover or headpiece then moves downward under only its own weight, due to the free-wheeling aspect, so that no endangerment is possible for people who find themselves under the cover or headpiece or another structural part during the downward sliding.

Such a free-wheeling can be achieved in simple fashion in one advantageous embodiment in that the drive only presses against the helical slider in one axial direction, while in the opposite direction of the drive the helical slider is not forced to move along with the drive, but only follows it by virtue of the load moment acting on the rotary drive from the outside.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is an axial section view through the rotary drive in a first embodiment.

FIG. 2 is a partial representation of the rotary drive.

FIG. 3 is a section view along line III-III in FIG. 1.

FIG. 7 is a detailed view of the first and second embodiment.

FIG. 8 is an axial section view of FIG. 7.

FIG. 9 is an axial section view through the rotary drive in a third embodiment.

FIG. 10 is a section view along line X-X in FIG. 9.

FIG. 11 is an axial front view of FIG. 9 from the left.

FIG. 12 is an axial section view through the rotary drive in a fourth embodiment.

FIG. 13 is a section view along line XIII-XIII in FIG. 12.

FIG. 14 is an axial front view in FIG. 12 from the left.

FIG. 20 is an axial section view through the rotary drive in a sixth embodiment.

FIG. 21 is a section along line XXI-XXI in FIG. 20.

FIG. 22 is an axial section through the rotary drive in a seventh embodiment.

FIG. 23 is a section along line XXIII-XXIII in FIG. 22.

FIG. 24 is an axial section through the rotary drive in an eighth embodiment.

FIG. 25 is a section along line XXV-XXV in FIG. 24.

FIG. 26 is a section view along line XXVI-XXVI in FIG. 24.

FIG. 27 is an axial section view through the rotary drive in a ninth embodiment.

FIG. 28 is a section view along line XXVIII-XXVIII in FIG. 27.

DETAILED DESCRIPTION OF THE PREFERRED EMBODIMENTS

Figure 5:
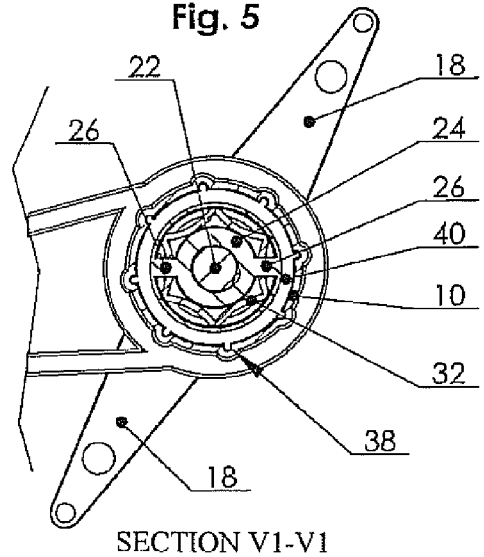
FIG. 5 a section along line V-V in FIG. 4.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

The rotary drive of the invention serves the mutual swiveling of two structural parts, e.g., two furniture elements. For example, a cover or a door can be swiveled relative to a body or, in particular, the headpiece of a bed relative to the bed frame. Each time, an outer tube of the rotary drive is firmly joined to one structural part, while one or two end pieces at the ends of the outer tube are firmly joined to the other structural part.

In the following description, each time the same reference numbers are used for functionally similar parts.

A first sample embodiment of the rotary drive is shown in FIGS. 1, 2, 3, 7 and 8. The rotary drive has an outer tube 10, in which an inner tube 12 runs continuously. The inner tube 12 is mounted in a closure cap 14 of the outer tube 10, able to rotate at both ends and unable to shift axially. The inner tube 12 is led out from the outer tube 10 at both ends by an end piece 16. A radially projecting fastening bracket 18 can be arranged at the end piece 16, for example.

When the rotary drive is used to swivel, e.g., the headpiece or footpiece of a bed frame, the inner tube 12 with the end pieces 16 is arranged by means of the fastening brackets 18 on the bed frame, while the outer tube 10 engages by corresponding levers with the headpiece and footpiece. The outer tube 10 with the closure caps 14 and the end pieces 16 forms a fully encapsulated drive, which is of special advantage for use in hospital beds, for hygienic reasons.

At one end of the inner tube 12, sitting coaxially firm in this inner tube 12, is a drive element, being configured as a motor 20, especially an electric motor. The coaxial motor shaft drives the rotation of a threaded spindle 22, which is arranged coaxially in the inner tube 12. On the threaded spindle 22 runs a spindle nut 24, which is led axially movable and nonrotatable in the inner tube 12. For this, the spindle nut 24 has radially outward projections. 26, which travel in axial guide slots 28 that are formed at the end of the inner tube 12 opposite the motor 20. A push tube 30 coaxially surrounding the inner tube 12 is fastened to the preferably diametrically arranged projections 26 outside the inner tube 12. Thus, the push tube 30 lies coaxially between the inner tube 12 and the outer tube 10 and is radially spaced apart from each of these. The push tube 30 extends from the spindle nut 24 and its projections 26 in the axial direction toward the motor end.

The inner tube 12 is configured in the axial region between the guide slots 28 and the motor 20 as a helical shaft 32, by shaping the outer periphery of the inner tube 12 with a steep thread 34.

FIG. 2 shows in detail in a side view the inner tube 12 with the fastening brackets 18 at its two ends, with one of the guide slots 28, in which the projection 26 of the spindle nut 24 can be seen, with the adjacent steep thread 34 of the helical shaft 32 and with fastening pins 36 of the motor 20.

The outer tube 10 is configured with guide grooves 38 running axially parallel on its inner circumference. As FIG. 3 shows, these guide grooves 38 can be fashioned as protrusions in the wall of the outer tube 10, for example. The outer tube 10 with the axially parallel guide grooves 38 is preferably manufactured as a drawn tube. A helical slider 40 is led axially displaceable and nonrotatable in the outer tube 10. For this, the helical slider 40 engages by axially parallel projections 42 on its outer circumference 42 in form fitting manner with the guide grooves 38. The helical slider 40 coaxially encloses the helical shaft 32 and sits by its inner thread profile 44 on the steep thread 34 of the helical shaft 32, as is known, e.g., for screw drills. The axial dimension of the thread profile 44 is substantially smaller than the pitch of the steep thread 34. The thread profile 44 can be formed in particular by only an axially flat disk, having an opening corresponding to the cross section profile of the steep thread 34. The push tube 30 bears axially freely against the helical slider 40 by its end away from the spindle nut 24.

The rotary drive in the first embodiment works as follows. If the motor 20 is driven in one direction of turning—the driving direction—then the threaded spindle 22 driven by the motor 20 pulls the spindle nut 24 axially toward the motor 20, since the spindle nut 24 is led in the guide slots 28 of the inner tube 12 such that it cannot rotate. The spindle nut 24 now presses, via the push tube 30, the helical slider 40 axially toward the end with the motor. The helical slider 40, which can rotate relative to the push tube 30, rotates during this axial advancement on the steep thread 34 of the helical shaft 32. Since the helical slider 40 is led in the outer tube 10 such that it can shift axially but not rotate, the rotation of the helical slider 40 entrains the outer tube 10, so that the outer tube 10 rotates relative to the inner tube 12 and its end pieces 16.

The nonbraking steep thread 34 of the helical shaft 32 has a much larger pitch than the threaded spindle 22, so that the rotation of the motor 20 is transformed with a very strong speed reduction and a very strong torque transmission into the rotation of the outer tube 10.

If the motor 20 is driven in the direction of rotation opposite the driving direction, the spindle nut 24 travels on the threaded spindle 22 in the opposite axial direction, i.e., away from the motor 20. Since the push tube 30 only lies freely against the helical slider 40, the spindle nut 24 does not entrain the helical slider 40 by the push tube 30 during this axial movement. Thus, the outer tube 10 is not forcefully entrained by the motor 20 during this direction of rotation of the motor 20. Since the steep thread 34 of the helical shaft 32 is not self-braking, the helical slider 40 can be moved by a corresponding torque force acting on the outer tube 10 and the spindle nut 24 can follow freely with the push tube 30 in the axial direction away from the motor 20. Thus, the rotary drive acts only in one direction of rotation, while in the opposite direction of rotation it has a so-called "free-wheeling". This is a desirable safety measure in many applications. For example, if a structural part is swung up by means of the rotary drive against its own weight, the downward swinging occurs, thanks to the free-wheeling, exclusively by this part's own weight and not under the transmitted torque of the motor 20. If a person's body part happens to be present beneath the structural part, only the natural weight of the part will be active during the downward movement, but not the torque of the motor 20, so that no danger or injury of the person can occur.

In FIGS. 7 and 8, the helical shaft 32 is shown with the helical slider 40 in detail. As can be seen, the helical slider 40 with its inner thread profile 44 has only a very slight axial dimension as compared to the pitch of the steep thread 34 of the helical shaft 32. FIGS. 7 and 8 show another variant, in which the steep thread 34 of the helical shaft 32 is configured with varying pitch. The change in the pitch of the steep thread 34 means a change in the speed reduction or torque transmission. Thanks to this changing of the pitch of the steep thread 34 along the axial length of the helical shaft 32, it is possible to configure the rotary drive not only with constant stepdown (when the pitch of the steep thread 34 remains the same), but also with progressive or degressive stepdown. For example, a swivel movement in the middle region of the swivel path can be configured with higher swivel speed and one at the beginning and end of the swivel path with lesser swivel speed. Thus, a diversified adaptation of the rotary drive to the particular application is possible.

Figure 6:
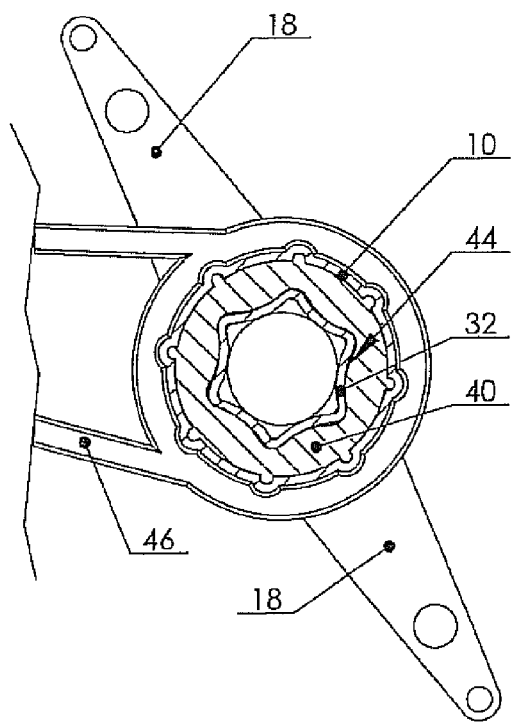
FIG. 6 is a section view along line VI-VI in FIG. 4.
Figure 4:
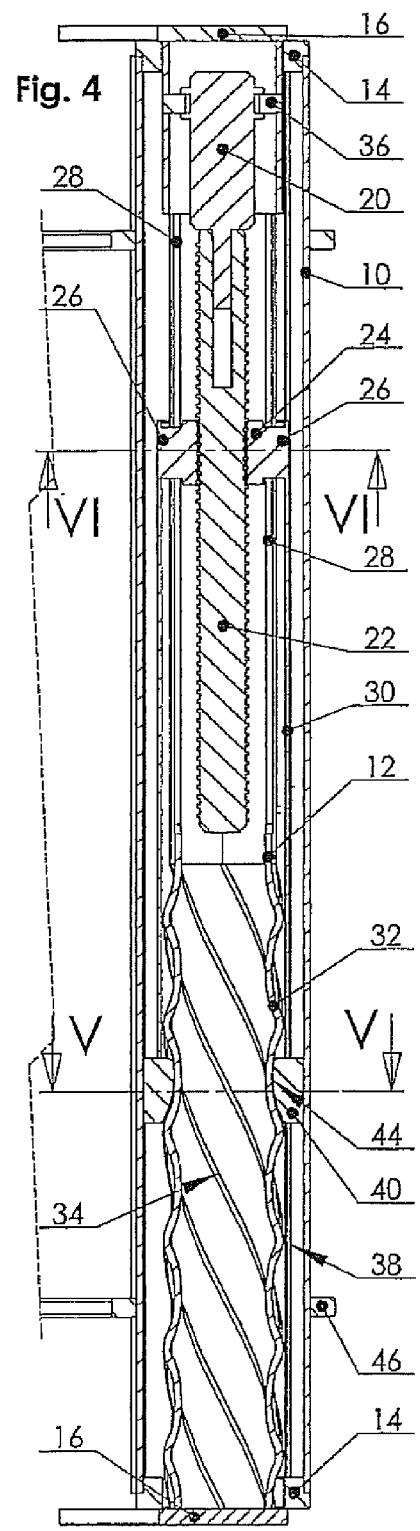
FIG. 4 is an axial section view through the rotary drive in a second embodiment.
Figure 17:
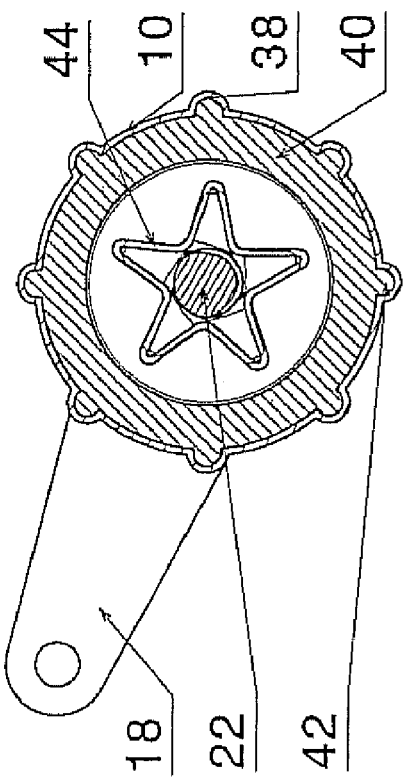
FIG. 17 is a section view along line XVII-XVII in FIG. 15.
Figure 16:
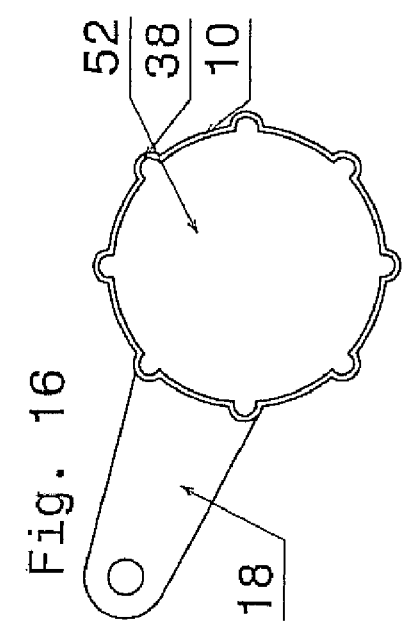
FIG. 16 is an axial front view of FIG. 12 from the right.

FIGS. 4 to 6 show a second embodiment of the rotary drive. This embodiment basically concurs with the first sample embodiment, so that for the most part one can refer to the preceding description.

In contrast with the first sample embodiment, in the second sample embodiment of FIG. 4 the guide slots 28 of the inner tube 12 are arranged at the end of the inner tube 12 with the motor. The segment of the inner tube 12 fashioned as a helical shaft 32, on the other hand, is arranged at the end of the inner tube 12 away from the motor 20. If the motor 20 is operated in the driving direction, the spindle nut 24 is moved away from the motor 20 and presses the helical slider 40 axially away from the motor 20 by means of the push tube 30, so that the helical slider 40 and, with it, the outer tube 10 is forced to rotate relative to the inner tube 12 and the end pieces 16. In the opposite direction of turning of the motor 20, the spindle nut 24 is pulled toward the motor 20, so that the push tube 30 can move axially away from the helical slider 40 and the freewheeling becomes active.

In FIGS. 4 and 6, furthermore, it is shown how a fastening plate 46 is form-fitted on the outer circumference of the outer tube 10. With such a fastening plate 46, the outer tube 10 can be attached to the corresponding structural part.

In FIGS. 9 to 11 a third embodiment of the rotary drive is shown. To the extent that this embodiment agrees with the preceding embodiments, the same reference numbers are used and reference is made to the preceding description.

In the third sample embodiment, an end piece 16 is mounted and able to rotate only at one end of the outer tube 10, so that the rotary drive can only be attached at one end, e.g., by means of a fastening bracket 18, to one structural part. The hollow helical shaft 32 is fastened coaxially to the end piece 16 which is mounted and able to rotate in the end of the outer tube 10, but not shift axially. The helical slider 40 travels on the steep thread 34 of the helical shaft 32, being led in the axial guide grooves 38 of the outer tube 10 so that it can shift axially but not rotate. The helical slider 40 in this sample embodiment is configured as a coaxial bushing, at whose one end the inner thread profile 44 is constructed, by which the helical slider 40 travels on the helical shaft 32. At the axially opposite end of the helical slider 40, the motor 20 is firmly attached by a flange. The motor shaft is mounted and able to rotate in the helical slider 40 by means of a roller bearing 48 and it drives the threaded spindle 22, which is led coaxially through the helical slider 40 and protrudes axially into the hollow helical shaft 32. The spindle nut 24 is firmly attached to the free end of the helical shaft 32 lying inside the bushing-like helical slider 40.

If the motor 20 is turned on, it turns the threaded spindle 22, so that the helical slider 40 moves with the motor 20 axially relative to the helical shaft 32. Since the helical slider 40 can move axially but cannot rotate in the outer tube 10, the axial displacement of the helical slider 40 relative to the steep thread 34 of the helical shaft 32 brings about a relative movement between the end piece 16 that is connected to the helical shaft 32 and the outer tube 10. Depending on the direction of turning of the threaded spindle 22, the helical slider 40 travels with the motor 20 to the right or to the left in the outer tube 10 and the outer tube 10 turns in the corresponding direction with respect to the end piece 15. End switches 50 can limit the axial movement of the helical slider 40 in the outer tube. No free-wheeling is provided in this embodiment, so that the rotary drive is driven necessarily and by motor action in both directions of turning.

In FIGS. 12 to 17 a fourth embodiment is shown, being similar to the third sample embodiment of FIGS. 9 to 11.

Figure 15:
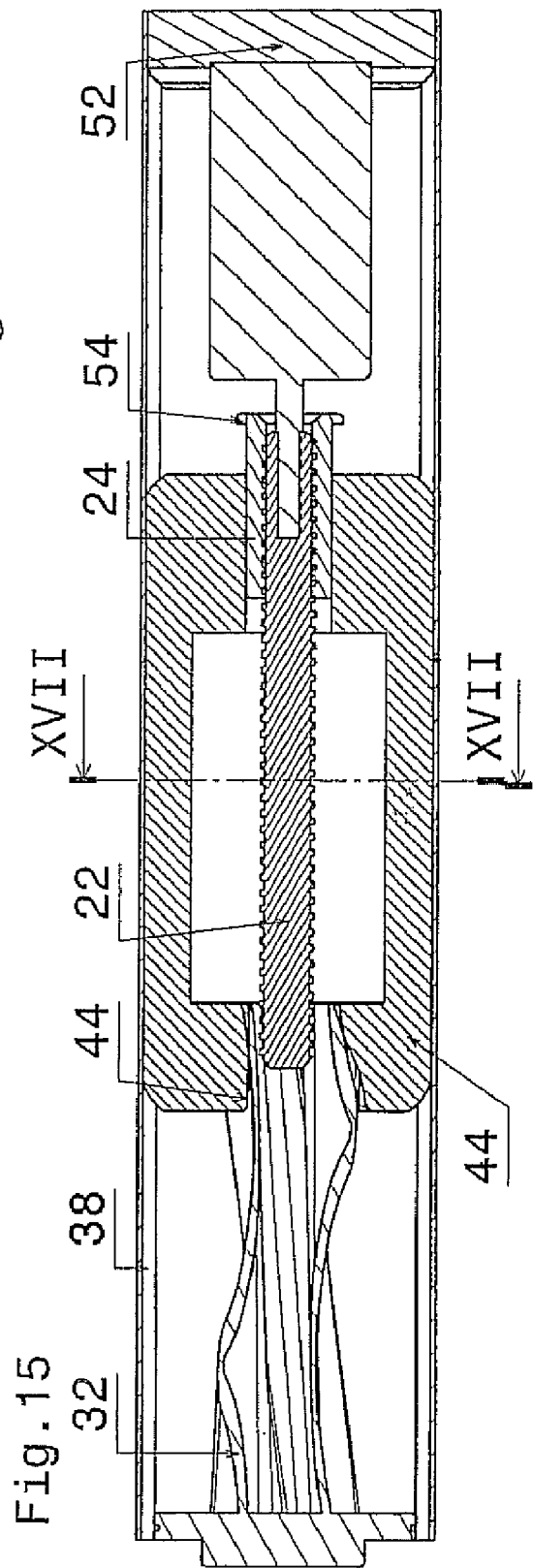
FIG. 15 is an axial section view through the rotary drive of the fourth embodiment in an operating position different from FIG. 12.

Here, again, the helical shaft 32 is joined firmly to an end piece 16 mounted and able to rotate in the outer tube 10. The helical slider 40 is configured as an axial bushing, whose one end has the inner thread profile 44 which travels on the helical shaft 32. The helical slider 40 is axially movable but unable to rotate in the outer tube 10. In this fourth sample embodiment, the motor 20 sits by means of an end plug 52, unable to rotate or shift, in the outer tube 10, at its end opposite the end piece 16 and the helical shaft 32. The spindle nut 24 sits on the coaxial threaded spindle 22 driven by the motor 20, being mounted in this embodiment unable to rotate and able to shift axially in the bushing-shaped helical slider 40. The spindle nut 24 has a radially broadened stop shoulder 54 at its end facing the motor 20. In contrast with the third sample embodiment of FIGS. 9 to 11, in this embodiment the rotary drive is only active in one direction of turning, while in the opposite direction of turning it has a free-wheeling, as is prescribed for certain applications due to safety factors. If the motor 20 is activated in the driving direction, the threaded spindle 22 pushes the spindle nut 24 away from the motor 20, until the spindle nut 24 rests against the end face of the helical slider 40 by its stop shoulder 54, as is shown in FIG. 12. Upon further turning of the threaded spindle 22 in the driving direction, the spindle nut 24 now pushes the helical slider 40 further, so that it shifts on the helical shaft 32 and is placed in rotation, whereby the outer tube 10 guiding the helical slider 40 rotates relative to the end piece 16. If the motor 20 is driven in the opposite direction of rotation, the rotating threaded spindle 22 pulls the spindle nut 24 toward the motor. 20, and the spindle nut 24 is thereby pulled out free from the helical slider 40, as shown in FIG. 15, without the helical slider 40 being forced to move on the helical shaft 32. The free-wheeling is active.

The third and fourth embodiment are characterized in particular in that they are assembled from a very small number of individual parts. This results in low manufacturing and assembly costs.

Figure 19:
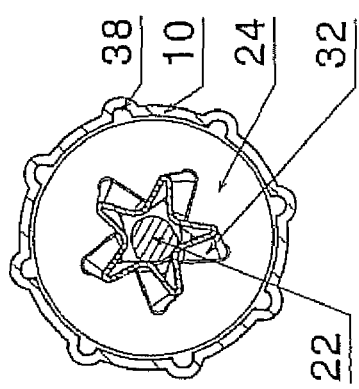
FIG. 19 is a section along line XIX-XIX in FIG. 18.
Figure 18:
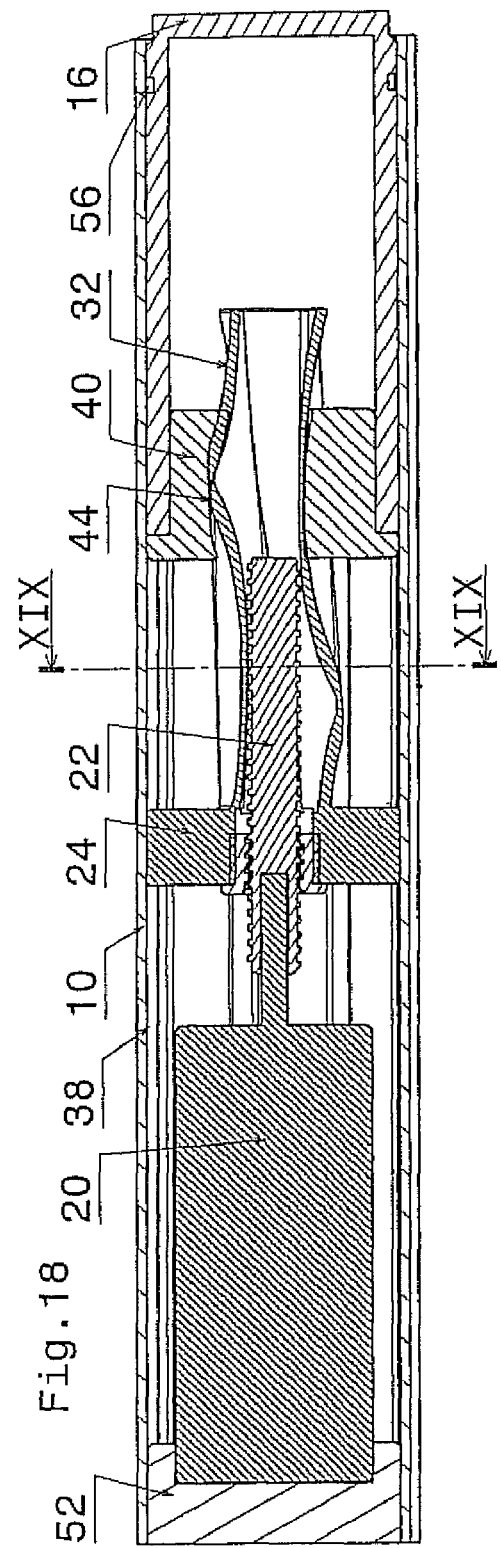
FIG. 18 is an axial section view through the rotary drive in a fifth embodiment.

In FIGS. 18 and 19 a fifth embodiment of the rotary drive is shown. In this embodiment, the motor 20 sits by means of an end plug 52 in the outer tube 10, unable to rotate or move axially. The spindle nut 24 travels on the coaxial threaded spindle 22, driven by the motor 20, and is guided at its outer periphery in the guide grooves 38 of the outer tube 10 in axially movable but nonrotatable manner. At the end away from the motor 20, the hollow helical shaft 32 is firmly attached to the spindle nut 24. The threaded spindle 22 protrudes coaxially into the hollow helical shaft 32. Preferably, the spindle nut 24 is made from an external molded part, which is moved in the outer tube 10, and a nut firmly inserted in the former. The helical shaft 32 is molded onto the external molded part. The helical shaft 32 passes through the inner thread profile 44 of a helical slider 40. The helical slider 40 is firmly joined to an end piece 16, which closes the end of the outer tube 10 opposite the motor 20. The end piece 16 with the helical slider 40 is accommodated in the outer tube 10 so that it can rotate and prevented from axial displacement by a securing ring 56. Under driving of the motor 20, the spindle nut 24 with the helical shaft 32 moves axially in the outer tube 10, depending on the direction of turning of the motor 20. Thanks to the axial movement of the helical shaft 32, the helical slider 40 and, with it, the end piece 16 is rotated relative to the outer tube 10.

In FIGS. 20 and 21 a sixth embodiment of the rotary drive is shown, being characterized by an especially short axial construction length.

The motor 20 in this embodiment sits coaxially secure in the hollow helical shaft 32. The motor 20 with the helical shaft 32 is firmly joined to an end piece 16, which is mounted so that it can rotate but not move axially in the outer tube 10. In the guide grooves 38 of the outer tube 10, the helical slider 40 is mounted so as to be axially movable but not able to rotate. The helical slider 40 in this embodiment is configured as a hollow bushing. In one axial end surface of the helical slider 40 is fashioned the inner thread profile 44 by which the helical slider 40 travels on the helical shaft 32. The other axial end surface of the helical slider 40, away from the motor 20, is fashioned as a spindle nut 24 and sits on the threaded spindle 22 that is driven by the motor 20 and passes coaxially through the bushing-shaped threaded spindle 22.

If the motor 20 is placed in operation, it will drive the threaded spindle 22, whereby the helical slider 40 moves toward or away from the motor 20, depending on its direction of rotation. In this way, the helical slider 40 traveling on the helical shaft 32 that is firmly connected to the motor 20 is caused to rotate and carries along the outer tube 10 with this rotational movement, so that the outer tube 10 and the end piece 16, with a fastening bracket 18 for example, turn toward each other. The rotary drive can only be mounted at one axial end, while the axial end of the outer tube 10 that is opposite the end piece 16 is closed off by a closure cap 58.

In FIGS. 22 and 23, a seventh embodiment of the rotary drive is shown.

This embodiment corresponds in its basic layout to the embodiment of FIGS. 12 to 17, so that reference is made to the description there. In contrast with the embodiment of FIGS. 12 to 17, in this seventh embodiment of FIGS. 22 and 23 a pneumatic spring 60 serves in place of a motor as the drive element. The pneumatic spring 60 can be actuated via a release valve 62, so that the pressure piston 64 is moved axially. The piston rod 66 connected to the pressure piston 64 sits in the helical slider 40 and moves it axially in the outer tube 10. The helical slider 40 has the helical shaft 32 passing through it, which is connected to an end piece 16 mounted and able to rotate in the outer tube 10.

The piston rod 66 can be arranged firmly in the helical slider 40 or it can also move axially and engage with the helical slider 40 and carry it along only in one direction of movement with a stop shoulder, so that the rotary drive only works actively in one direction of rotation and has a free-wheeling in the other direction of rotation, as described in the sample embodiment of FIGS. 12 to 17. The pneumatic spring 60 enables a control of the axial movement of the helical slider 40 and thus of the rotary motion between outer tube 10 and end piece 16, so that the rotary drive can be adapted to the particular application as regard speed of rotation and torque. Of course, instead of the pneumatic spring 60 other fluid-operated drive elements with corresponding function can be used, in particular pneumatic drive elements.

In FIGS. 24 to 26 an eighth embodiment of the rotary drive is shown.

The outer tube 10 can be mounted at both its axial ends by means of fastening plates 46. At one end of the outer tube 10, the drive element is arranged coaxially firm herein, namely, the motor 20. By means of a roller bearing 48, an inner tube 12 is mounted and can rotate on the motor 20, being configured in its segment opposite the motor 20 as a hollow helical shaft 32. The inner tube 12 with the helical shaft 32 are coaxially arranged in the outer tube 10. The motor 20 drives the threaded spindle 22, which is situated coaxially in the inner tube 12. The spindle nut 24 travels on the threaded spindle 22. The spindle nut 24 carries a push tube 30, which extends coaxially in the inner tube 12 and the helical shaft 32. The end of the push tube 30 away from the motor 20 carries a helical slider 40, which in this embodiment is arranged inside the hollow helical shaft 32 and engages with the inner steep thread 34 of the hollow shaft by a corresponding outer thread profile. The spindle nut 24 with the push tube 30 and the helical slider 40 can move axially and are prevented from rotating. For this, the push tube 30 can be fashioned with a round cross section and be led in a guide tube 68, which is arranged on the motor 20 in an axially firm and nonrotatable manner. In the sample embodiment shown, the guide tube 68 and the push tube 30 have, e.g., a square cross section.

If the motor 20 is turned on, the threaded spindle 22 will rotate. The spindle nut 24 with the push tube 30 is displaced according to the direction of turning of the motor 20 on the threaded spindle 22, by which the helical slider 40 is shifted axially in the helical shaft 32 and this is caused to rotate relative to the outer tube 10. In the sample embodiment shown, the rotary movement of the inner tube 12 and the helical shaft 32 relative to the outer tube 10 is also transmitted to the outside in that fastening brackets 18 are placed on the inner tube 12 and the helical shaft 32, and these project radially outward through corresponding openings 70 in the outer tube 10.

Since the helical slider 40 in this embodiment is situated inside the helical shaft 32, it cannot move axially and rotate in guide grooves of the outer tube 10, but instead in the guide tube 68 firmly connected to the outer tube 10 via the motor 20.

In FIGS. 27 and 28 a ninth embodiment of the rotary drive is shown, in which the torque transmitted by the rotary drive is further assisted by a spring force.

In FIGS. 27 and 28 this is explained by a sample embodiment which corresponds to the basic layout of the sample embodiment of FIGS. 12 to 17. Accordingly, reference is made to the description there. In addition to the sample embodiment of FIGS. 12 to 17, a spring 72 is provided, being configured as a helical compression spring and arranged coaxially in the hollow helical shaft 32 and the bushing-shaped helical slider 40. The spring 72 thrusts on the one hand against the end piece 16 and on the other hand against the helical slider 40. The spring 72 assists the rotary drive of the motor 20 in one direction of turning, so that the rotary drive has an increased torque in one preferred direction of turning, while in the opposite direction of turning the spring 72 is tensioned as a working storage.

It is at once evident to the person versed in the art that such a spring assistance can also be used accordingly in the other embodiments of the rotary drive. Moreover, it is at once evident that in place of a helical compression spring one can also use other types of spring, such as compression springs, tensions springs, motive springs or other working storage elements.

Figure 29:
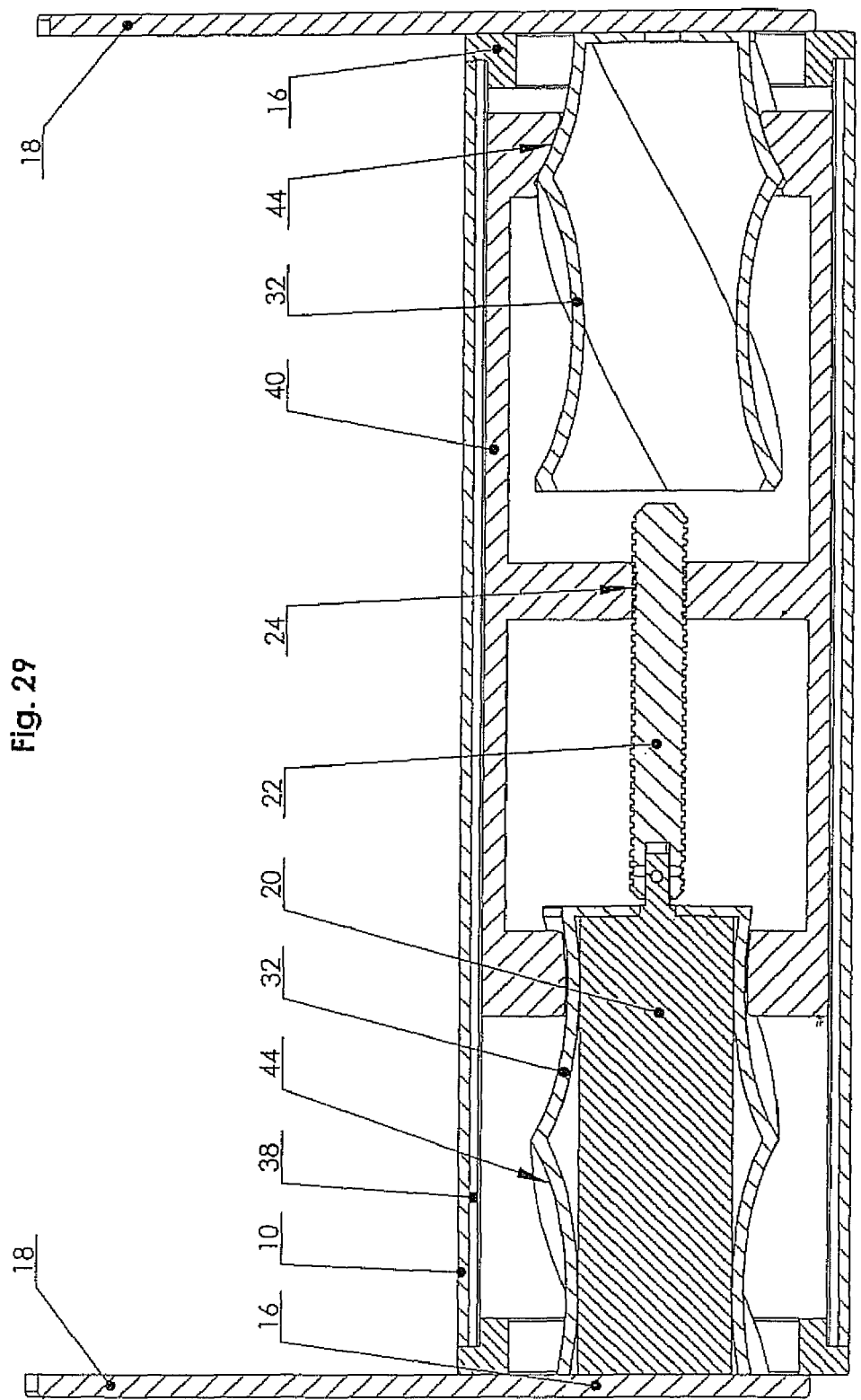
FIG. 29 is an axial section view through the rotary drive in a tenth embodiment.

In FIG. 29 a tenth embodiment of the rotary drive is shown. This embodiment is based on the embodiment of FIGS. 20 and 21, so that reference is made to the description there.

Whereas in the sample embodiment of FIGS. 20 and 21 the end of the outer tube opposite the motor is closed off by a closure cap, in the sample embodiment of FIG. 29 a coaxial helical shaft 32 is likewise arranged at the end of the outer tube 10 opposite the motor 20, being mounted by means of an end piece 16 unable to shift axially but able to rotate in the outer tube 10. The helical slider 40 is configured as an axially elongated bushing, which is axially guided in the outer tube 10. In the axial middle, the helical slider 40 sits by a spindle nut 24 on the threaded spindle 22, driven by the motor 20. At its two axial end surfaces, the helical slider 40 is configured with an inner thread profile 44, wherein the thread profile 44 of the one axial end sits on the one helical shaft 32 and the thread profile of the other axial end of the helical slider 40 sits on the other opposite helical shaft 32. When the motor 20 drives the threaded spindle 22, the helical slider 40 moves axially in the outer tube 10. The inner thread profiles 44 fashioned at both ends of the helical slider 40 thereby place the two helical shafts 32 in rotation, so that the end pieces 16 with the fastening brackets 18 arranged on them are rotated relative to the outer tube 10. Depending on the pitch and direction of the windings of the two helical shafts 32, the end pieces 16 can be turned in the same or opposite direction and/or with equal or different speed.

Figure 30:
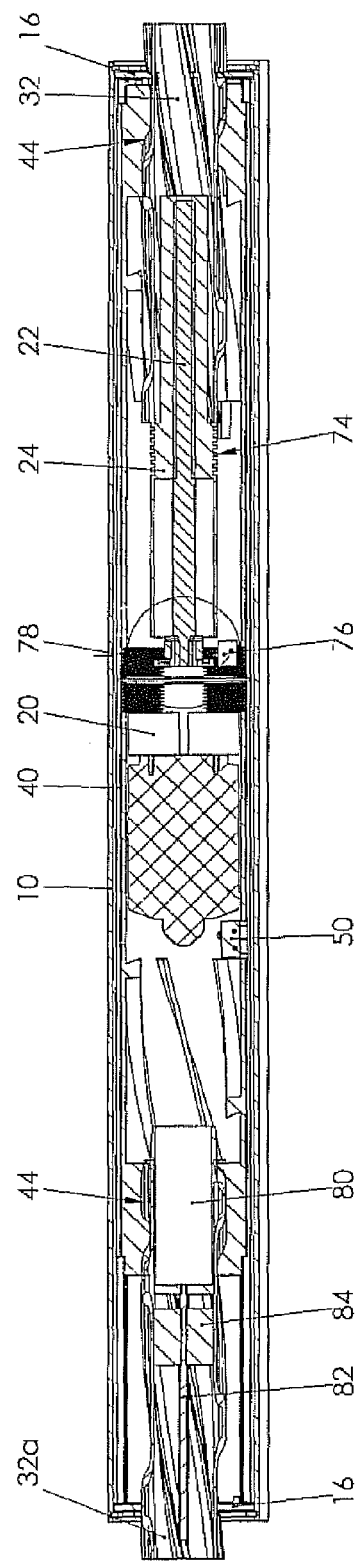
FIG. 30 is an axial section view through the rotary drive in an eleventh embodiment.

In FIG. 30 an eleventh embodiment of the rotary drive is shown. To the extent that this embodiment agrees with previously described embodiments, the same reference numbers are used and reference is made to the respective previous description.

In the outer tube 10, the helical slider 40 is guided by means of axial guide grooves 38 so that the helical slider 40 can move axially but not rotate in the outer tube 10. The helical slider 40 is configured as a hollow cylindrical bushing. At the two axial ends of the helical slider 40 there is formed the inner thread profile 44. In each of the two axial ends of the outer tube 10 is coaxially arranged a helical shaft 32 and 32*a*. The helical shafts 32 and 32*a* each sit firmly in an end piece 16, which is axially secured and able to rotate in the outer tube 10. The helical shafts 32 and 32*a* protrude from the end pieces 16 coaxially into the outer tube 10. The helical slider 40 travels by its inner thread profiles 44 on the steep thread of the helical shafts 32 and 32*a*.

The drive element is formed by a motor 20, which is arranged axially firm and unable to rotate inside the helical slider 40. The motor 20 drives the coaxially arranged threaded spindle 22. The threaded spindle 22 is able to move axially in the gearing of the motor 20 within a small travel x of a few millimeters. The spindle nut 24 sits on the threaded spindle 22. The threaded spindle 22 and the spindle nut 24 protrude coaxially into the hollow helical shaft 32. The spindle nut 24 has an outer shoulder by which the spindle nut 24 can brace itself axially against the inner end of the helical shaft 32. The axial end stop of the outer shoulder of the spindle nut 24 at the end of the helical tube 32 can be cushioned by a dampening spring 74, which is installed between the outer shoulder of the spindle nut 24 and the helical shaft 32. The spindle nut 24 sits in the helical shaft 32 unable to rotate and able to move axially under friction.

At the axial end face of the motor 20, besides the threaded spindle 22, there is arranged a safety end switch 76. An activating ring 78 sits on the threaded spindle 22 to activate the safety end switch 76.

Furthermore, an end switch 50 is arranged in the helical slider 40 at the side of the motor 20 away from the threaded spindle 22. To activate the end switch 50, an activating tappet 80 is used, being arranged in the hollow helical shaft 32a. The activating tappet 80 protrudes axially from the inner end of the helical shaft 32a into the helical slider 40. The activating tappet 80 sits on an axial to threaded rod 82, which can be adjusted in a nut 84. The nut 84 sits firmly in the helical shaft 32a. By twisting the threaded rod 82, the axial position of the activating tappet 80 in the helical shaft 32a can be adjusted.

In the eleventh embodiment shown in FIG. 30, the rotary drive works as follows. To lift up a structural part, such as the headpiece of a bed frame, the outer tube 10 is connected to the headpiece being lifted and the helical shafts 32 and 32a are joined by their end pieces 16 to the frame of the bedstead. The placement of two helical shafts 32 and 32a at the two ends of the outer tube 10 has the benefit of a symmetrical torque bracing at both ends of the rotary drive.

Figure 30B:
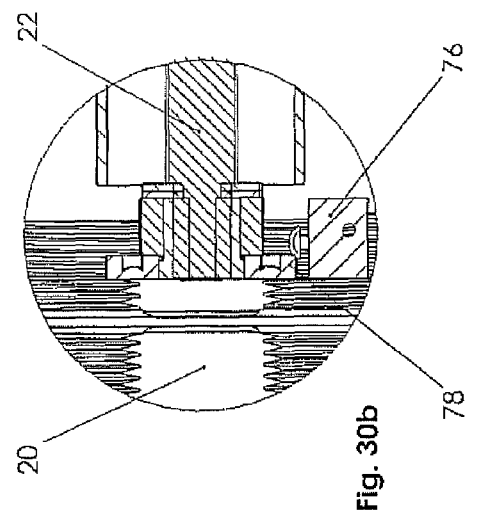

To lift the headpiece or some other part against its own weight, the motor 20 serving as the drive element is switched on in the direction of turning so that the threaded spindle 22 moves the spindle nut 24 toward the helical shaft 32, so that the spindle nut 24 is braced by its outer shoulder axially against the helical shaft 32. As a result, the helical slider 40 in FIG. 30 is moved to the left and travels by its inner thread profiles 44 on the steep threads of the helical shafts 32 and 32a. The helical slider 40 and, with it, the outer tube 10 are in this way turned relative to the helical shafts 32, 32a and the end pieces 16. The dampening spring 74 brings about a soft commencement of the rotary movement and cushions any load jolts. During this movement, the threaded spindle 22 presses axially against the gearing of the motor 20. As is shown in the magnified detail view of FIG. 30b, the activating ring 78 thereby moves axially to the left out from the region of the safety end switch 76. Thus, the safety end switch 76 is not activated, so that current can flow through the motor 20. The drive can continue in this direction of turning until the helical slider 40 has moved so far to the left that the end switch 50 reaches the activating tappet 80 and is activated by it. When the activating tappet 80 activates the end switch 50, the drive is switched off by the motor 20 and the swiveling motion is ended. Thus, the swivel path of the rotary drive can be adjusted and limited by axial adjustment of the activating tappet 80.

Figure 30A:
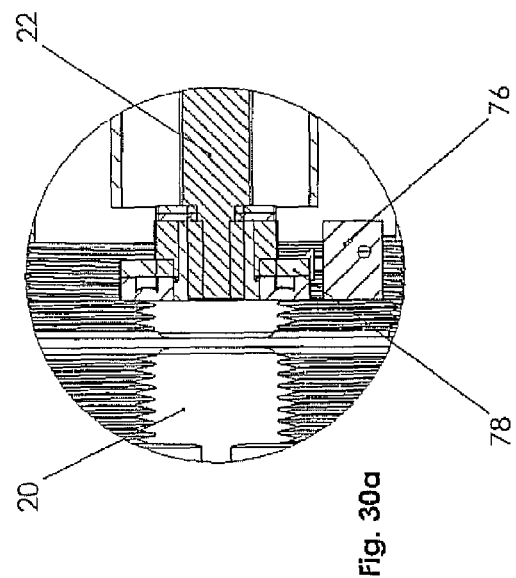

In order to move the structural part, such as the headpiece of the bedstead, downward, the motor 20 is driven in the opposite direction of turning. In this way, the threaded spindle 22 is rotated into the threaded nut 24, so that the helical slider 40 moves to the right in FIG. 30 and, thanks to the non-self-braking steep thread of the helical shafts 32 and 32a, rotates together with the outer tube 10 toward these helical shafts 32, 32a. If the opposite rotary movement of outer tube 10 and helical shafts 32, 32a is inhibited, e.g., because a foreign object has gotten jammed between the parts moving toward each other, the free-wheeling comes into play. If the mutual rotary movement of outer tube 10 and helical shaft 32 is blocked, the driven threaded spindle 22 pulls the spindle nut 24 out from the helical shaft 32, since the spindle nut 24 is not braced in this axial direction. This interrupts the rotary drive between outer tube 10 with the helical slider 40 and the helical shaft 32. Now, only the torque brought about by the natural weight of the headpiece is acting between the outer tube 10 and the helical shafts 32, 32a. But, since the spindle nut 24 sits with friction in the helical shaft 32, at first the threaded spindle 22, which sits in the motor and can be slightly shifted axially, is pulled by its axial travel x to the right and out from the gearing of the motor 20, so that the threaded spindle 22 takes up the position shown in FIG. 30a. As a result, the activating ring 78 engages with the safety end switch 76 and activates the safety end switch 76. As a result, the electrical drive of the motor 20 is interrupted. Thus, the spindle nut 24 is pulled no further out from the helical shaft 32 and the free-wheeling path is interrupted. The freewheeling thus ensures the necessary protection against a jamming under the driving torque of the motor 20. In addition, the safety end switch 76 prevents the motor 20 from continuing to run in idle mode during the free-wheeling. This makes sure that the movable part, such as the headpiece of the bedstead, does not fall down freely when the obstacle is removed.

Figure 31:
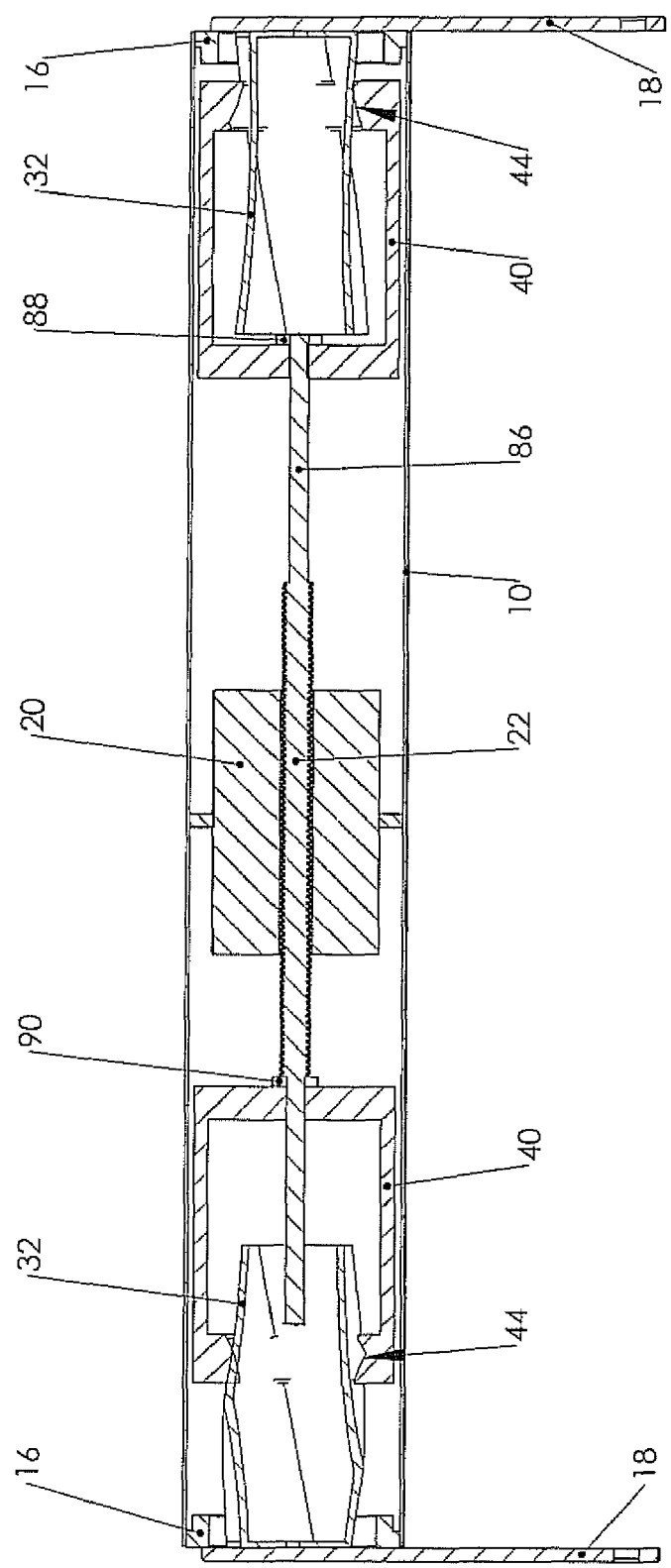
FIG. 31 is an axial section view through the rotary drive in a twelfth embodiment.

FIG. 31 shows a twelfth embodiment of the rotary drive. In this embodiment as well, end pieces 16 which can be rotated by the rotary drive toward the outer tube 10 are arranged at both ends of the outer tube 10, so that a symmetrical torque bracing is present at both ends of the rotary drive.

In this twelfth embodiment, the drive element is configured as a motor 20, which is arranged in the middle length of the outer tube 10, firm against rotation and unable to shift in the outer tube 10. The motor 20 has a continuous rotationally driven hollow shaft, which is configured with an internal thread. The threaded spindle 22 passes coaxially through the hollow shaft of the motor 20, the internal thread of the shaft engaging in the thread of the threaded spindle 22. When the hollow shaft of the motor 20 is driven in rotation, the threaded spindle 22 is accordingly shifted axially with respect to the motor 20. The threaded spindle 22 has segments with non-round cross section at both its axial ends, e.g., with a hexagonal cross section. On either side of the motor 20, helical sliders 40 are installed in the outer tube 10, being led in the outer tube 10 such that they can shift axially but not rotate. The helical sliders 40 each have the shape of a hollow cylindrical bushing. In the end face of the helical slider 40 turned toward the motor 20, an axial opening is provided in the middle, whose cross section corresponds to the nonround cross section of the segments 86 of the threaded spindle 22. The helical sliders 40 are in this way able to shift axially on the segments 86 of the threaded spindle 22 and prevent the threaded spindle 22 from rotating in relation to the outer tube 10. At the outer right end of the segment 86 of the threaded spindle 22 in FIG. 31 there is an end stop 88 with broadened diameter, situated inside the helical slider 40. At the left side of the threaded spindle 22 in FIG. 31 is arranged an end stop 90 of broadened diameter, being situated at the point where the thread of the threaded spindle 22 passes into the nonround segment 86. This end stop 90 is located at the outer end of the helical slider 40 toward the motor 20.

At the axial end face away from the motor 20, the helical sliders 40 are each configured with an internal thread profile 44. By this internal thread profile 44, the helical sliders 40 each travel on a hollow helical shaft 32 with a steep thread 34. These helical shafts 32 protrude coaxially into the helical sliders 40 and each sit firmly on an end piece 16, which is mounted and able to rotate in the end of the outer tube 10. The end piece 16 can be configured, for example, with a fastening bracket 18.

In this twelfth embodiment, the rotary drive works as follows. To lift a structural part, such as the headpiece of a bedstead, the motor 20 is driven in the direction of turning in which its rotating hollow shaft moves the threaded spindle 22 to the left in FIG. 31. The threaded spindle 22 is guided without ability to rotate by means of the nonround segments 36 and the helical sliders 40. As the threaded spindle 22 moves to the left, it pulls along with it the right helical slider 40 thanks to the end stop 88, while it pushes and carries along the left helical slider 40 by the end stop 90. The two helical sliders 40 are in this way moved to the left in the outer tube 10. The engagement of the helical sliders 40 with the steep thread 34 of the helical shafts 32 places the helical sliders 40 with the outer tube 10 in rotation with respect to the helical shafts 32 with the end pieces 16 and the fastening brackets 18.

To lower the headpiece, the motor is driven in the opposite direction of turning, whereby the threaded spindle 22 is moved to the right. In this axial direction of movement the end stops 88 and 90 are not active, so that the outer tube 10 with the helical sliders 40 are moved under the torque of gravity on the helical shafts 32. If the swivel movement of the headpiece is prevented by a foreign object, the rotary movement of the outer tube 10 and the helical sliders 40 is blocked. The continuing driving of the motor 20, however, produces no additional torque, since the threaded spindle 22 can move freely and axially with respect to the helical sliders 40, so that the right segment 86 of the threaded spindle 22 is shoved into the right helical slider 40, while the left segment 86 is pulled axially out of the left helical slider 40. This fulfills the freewheeling function.

Individual advantageous embodiments of the rotary drive have been depicted and described for one or more sample embodiments. It is obvious to the person versed in the art that such embodiments can also be transferred to other sample embodiments for which they have not been depicted.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A rotary drive, said rotary drive comprising:
   (a) a drive element; and
   (b) an outer tube;
      (i) at least one end piece that is able to rotate in relation to said outer tube and cannot shift axially;
      (ii) at least one helical slider arranged able to move axially in said outer tube but not rotatable; and
      (iii) at least one helical shaft arranged axially parallel in said outer tube, which interacts by a thread with a thread profile of said at least one helical slider; and
   (c) wherein said relative axial movement of said helical slider and said helical shaft brought about by said drive element is transformed into a relative rotation of said outer tube and said end piece;
   (d) wherein said drive element is arranged coaxially inside said outer tube; and
   (e) wherein said helical shaft and said thread profile of said helical slider are arranged coaxially in said outer tube, and
   (f) an end piece is mounted coaxially in at least one end of said outer tube.

2. A rotary drive according to claim 1, wherein:
said drive element is an electric motor with a motor shaft coaxial to said outer tube, which drives the rotation of a threaded spindle coaxial to said outer tube, and a spindle nut running on said threaded spindle operative to bring about said relative axial movement.

3. A rotary drive according to claim 2, wherein:
said spindle nut is arranged on said helical slider.

4. A rotary drive according to claim 1, wherein:
said drive element only moves said helical slider and said helical shaft actively relative to each other in one axial direction, while in the opposite axial direction a freewheeling interrupts said rotary drive.

5. A rotary drive according to claim 1, wherein:
said helical shaft is a hollow shaft.

6. A rotary drive according to claim 1, wherein:
said thread of said helical shaft has a constant pitch or an axially varying pitch.

7. A rotary drive according to claim 1, wherein:
said rotary drive is assisted in one preferred direction of turning by a working storage element, and wherein said working storage is tensioned in the opposite movement.

8. A rotary drive according to claim 7, wherein:
said working storage element is a spring.

9. A rotary drive according to claim 1, wherein:
said outer tube is sealed at both axial ends.

10. A rotary drive according to claim 9, wherein:
said two axial ends of said outer tube are closed off by respective end pieces which can rotate relative to said outer tube.

11. A rotary drive, said rotary drive comprising: a drive element, said drive element further comprising:
   (a) an outer tube with an end piece mounted in respective axial end of said outer tube, said outer tube being able to rotate axially;
   (b) a plurality of helical shafts, each one of said plurality of helical shafts being firmly arranged at said respective end pieces and coaxially protruding into said outer tube;
   (c) a helical slider, wherein:
      (i) said helical slider is able to move axially, but not rotatably, in said outer tube;
      (ii) said helical slider being configured as a hollow cylindrical bushing, with a set of thread profiles configured at the two axial end surfaces of said helical slider, each one of said set of thread profiles enclosing one of said helical shafts and interacting with a thread of said helical shafts;
      (iii) said drive element is arranged in said helical slider;
      (iv) said drive element operatively drives a coaxially arranged threaded spindle; and
         (1) wherein a spindle nut sits on the thread of said threaded spindle;
         (2) wherein said threaded spindle and said spindle nut engage coaxially in one of said helical shafts; and
         (3) wherein said spindle nut is braced by an outer shoulder axially against the inner end of said helical shaft.

12. A rotary drive according to claim 11, wherein:
said spindle nut is guided in said hollow helical shaft such that said spindle nut cannot rotate, but can move axially.

13. A rotary drive according to claim 12, wherein:
said spindle nut can move axially in said helical shaft under friction, while said threaded spindle can move axially in said drive element and wherein an activating mechanism sits on said threaded spindle, which interacts with a safety end switch arranged on said drive element.

14. A rotary drive according to claim 11, wherein:
an activating tappet is arranged in one of said helical shafts, and which protrudes in an axially adjustable manner into said helical slider, and wherein an end switch is arranged in said helical slider, which is activated by said activating tappet to limit the path of rotation.

\* \* \* \* \*